(12) United States Patent
Eguchi

(10) Patent No.: US 7,220,003 B2
(45) Date of Patent: May 22, 2007

(54) IMAGE-PROJECTING APPARATUS

(75) Inventor: Masaharu Eguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/970,134

(22) Filed: Oct. 22, 2004

(65) Prior Publication Data
US 2005/0094112 A1 May 5, 2005

(30) Foreign Application Priority Data
Oct. 30, 2003 (JP) .............................. 2003-371345

(51) Int. Cl.
*G03B 21/26* (2006.01)
*G03B 21/00* (2006.01)
*G03B 21/14* (2006.01)
*G03B 21/20* (2006.01)
*G03B 3/00* (2006.01)

(52) U.S. Cl. ............................ 353/30; 353/69; 353/70; 353/85; 353/101

(58) Field of Classification Search ................. 353/30, 353/69, 70, 85, 101; 352/140, 141
See application file for complete search history.

(56) References Cited

U.S. PATENT DOCUMENTS

| 5,532,765 | A * | 7/1996 | Inoue et al. | ............... | 348/807 |
| 6,846,081 | B2 * | 1/2005 | Mochizuki et al. | ........... | 353/70 |
| 6,939,011 | B2 * | 9/2005 | Kobayashi | ................... | 353/69 |
| 7,108,375 | B2 * | 9/2006 | Eguchi | ........................ | 353/30 |
| 7,125,122 | B2 * | 10/2006 | Li et al. | ....................... | 353/31 |
| 2005/0046803 | A1 * | 3/2005 | Akutsu | ........................ | 353/69 |

FOREIGN PATENT DOCUMENTS

| JP | 5-188282 | 7/1993 |
| JP | 6-160085 | 6/1994 |
| JP | 2000-28901 | 1/2000 |
| JP | 3120526 B2 | 12/2000 |
| JP | 2001-317935 | 11/2001 |
| JP | 3272429 B2 | 4/2002 |

* cited by examiner

*Primary Examiner*—Melissa J. Koval
(74) *Attorney, Agent, or Firm*—Fitzpatrick, Cella, Harper & Scinto

(57) ABSTRACT

The present invention discloses an image-projecting apparatus which employs an AF (auto-focusing) system suitable for use conditions of the image-projecting apparatus and is capable of securing satisfactory AF accuracy under bright conditions. The image-projecting apparatus comprises a projection optical system which projects light from an image-forming element onto a projection surface, and a detecting system which performs a detecting operation of a distance to the projection surface or a detecting operation of a focusing state of the projection optical system with respect to the projection surface. The detecting system determines a condition of the detecting operation on the basis of the light-receiving intensity level of the light-receiving element which receives reflected light from the projection surface of light projected and performs the detecting operation in accordance with the condition.

23 Claims, 9 Drawing Sheets

IMAGE-PROJECTING APPARATUS

BACKGROUND OF THE INVENTION

1. Field of the Invention

The present invention relates to an image-projecting apparatus such as a liquid crystal projector, etc. In particular, the invention relates to a technology for detecting a focusing state by receiving reflected light when projecting light onto a projection surface, which is a focusing detection technology in the case where the light to be detected is reflection light which derives from image projecting light of the image-projecting apparatus.

2. Description of Related Art

Conventionally, as an AF (Auto-Focusing) method of a projector, some methods have been known, one of which is an active method which performs auto-focusing based on a principle of triangulation-optical type focusing detection by using infrared light, and another of which is a passive method which reads a contrast of brightness on a screen by means of a pair of light-receiving sensors and driving a lens by obtaining correlation values of respective pixels output and obtaining a distance.

Also, the passive method of the AF method has two types classified in a large category, one of which is a so-called two-image correlation (or, displacement detection) AF method (Refer to Japanese Patent No. 3120526) which an parallax image such as an AF chart being an object for focusing detection is formed on a plurality of photo electric sensors disposed in a predetermined base length and performs obtaining and comparing of image information, and another method (hill climbing) which obtains the optimal state of focusing by imaging an object for focusing detection on a multi-pixel optical sensor having a one-dimensional or two-dimensional pixel arrangement and detects the image sharpness (contrast) from the image information, and driving the focusing position of a lens for forming the object image in the sensor.

In addition to the above, by using characteristics of a projector itself projecting an image, a technology which detects a specifically projected image by a camera and detects the focusing by comparing an original image information projected with an image-taking information (Refer to Japanese Patent Application Laid-Open No. 2000-28901).

Where projection light of such a projector itself is used for focusing adjustment, processing is performs under the same conditions as advantageous conditions of brightness regardless although disadvantageous brightness for the passive AF, the passive AF method can be performing unnecessarily erroneous detecting operation of a focusing.

For this reason, a number of technologies which change such as a determination algorithm, a focusing detecting operation and a focusing detecting method in accordance with a target object and environmental brightness, when focusing detection is performed (Refer to Japanese Patent No. 3272429 and Japanese Patent Application Laid-Open No. 2001-317935).

In Japanese Patent No. 3272429, a focusing detecting apparatus which comprises a light emission unit which emits a light projected to a target object, a light emission output controller which controls light emitting output of the light emission, a first detector which receives reflected light from the target object and measuring the distance from the light-receiving position to the target object, and a determining unit which determines a dispersion of the distance measured a plurality of times by the first detector and the light emission output controller increases the light emitting output from the light emission unit when the dispersion determined by the determining unit exceeds a predetermined value.

Also, Japanese Patent Application Laid-Open No. 2001-317935 relates to a distance-detector apparatus which detects the distance to a target object by receiving reflected light from the target object with light projected, the distance-detector apparatus comprises a detector which detects a light-receiving intensity level of the reflected light and a controller which determines the number of times of projecting and receiving light in accordance with the detected light-receiving intensity level and controls for performing repeated projected and receiving by the number of times. In the distance-detector apparatus, the lower the light-receiving intensity level becomes, the greater the number of times of projecting and receiving light increased, and measurement result information are calculated by executing an average processing calculation on the basis of information obtained by projecting and receiving by a plurality of times.

However, the respective technologies are based on an infrared LED as a projection light source and an apparatus driven a battery. The respective technologies do not disclose any technology to improve the AF accuracy, which is suitable for a distance detecting or focusing detecting method used for an image-projecting apparatus such as a liquid crystal projector, etc.

Specifically, as has been proposed in Japanese Patent No. 3272429, in the case where the light emitting output of the light emission unit is increased in auto focusing (AF), in the image-projecting apparatus such as a liquid crystal display, etc., it is necessary to employ a lamp suitable for output control as a lamp for illuminating image-forming elements such as a liquid crystal panel, etc., thus problems occur such a costs are increased and it is not realistic.

Further, as described above, in the image-projecting apparatus, auto focusing of a projection optical system is performed on the basis of signals output from a sensor by forming reflected light from a projection screen onto the sensor. However, if the original brightness of a screen on which no image is projected is high (that is, environmental brightness: which becomes brightness at an area other than the projection screen during projecting an image) even if the brightness of a projection surface is high, a contrast suitable for distance detection (or focusing detection) on the screen cannot be obtained.

Therefore, in a case where a distance-detecting apparatus proposed by Japanese Patent Application Laid-Open No. 2001-317935 is applied to an image-projecting apparatus and only distance detection (or focusing detection) is performed by the number of times in accordance with the light-receiving intensity level of light (sum of projection light and environmental light) from a projection surface, there are cases where a contrast suitable for distance detection (or focusing detection) cannot be obtained on the sensor, and it is impossible to securely improve the AF accuracy.

SUMMARY OF THE INVENTION

It is therefore an object of the present invention to provide an image-projecting apparatus, in which an AF method suitable for use conditions of the image-projecting apparatus is employed, capable of securing satisfactory AF accuracy even in a bright environment.

An image-projecting apparatus according to one aspect of the invention comprises a projection optical system which projects light from an image-forming element onto a projection surface and a detecting system which performs a detecting operation of a distance to the projection surface or a detecting operation of a focusing state of the projection optical system with respect to the projection surface. The detecting system determines a condition of the detecting operation on the basis of a light-receiving intensity level of a light-receiving element which receives reflected light from the projection surface of light projected through the projection optical system, and performs the detecting operation in accordance with the condition.

Further, an image-projecting apparatus according to another aspect of the invention comprises a projection optical system which projects light from an image-forming element onto a projection surface and a detecting system which performs a detecting operation of a distance to the projection surface or a focusing state of the projection optical system with respect to the projection surface, the detecting system performing the detecting operation by projecting light onto the projection surface, receiving reflected light from the projection surface by a light-receiving element and using a signal from the light-receiving element. The detecting system includes an environmental light detecting section which detects the intensity level of environmental light, determines a condition of the detecting operation on the basis of the intensity level of the environmental light or a difference between the intensity level of the environmental light and the intensity level of the reflected light on the light-receiving element, and performs the detecting operation in accordance with the condition.

In addition, an image-projecting apparatus according to still another aspect of the invention comprises a projection optical system which projects light from an image-forming element onto a projection surface and a detecting system which performs a detecting operation of a distance to the projection surface or a focusing state of the projection optical system with respect to the projection surface, the detecting system performing the detecting operation by projecting light onto the projection surface and by using signal from a light-receiving element. The light-receiving element receives light from the projection area of the light on the projection surface and light from an outer area other than the projection area; and the detecting system obtains brightness information of the projection area and the outer area by using the signal from the light-receiving element, determines a condition of the detecting operation on the basis of the brightness information of at least one of the projection area an the outer area, and performs the detecting operation in accordance with the condition.

Also, an image-projecting apparatus according to still another aspect of the invention comprises a projection optical system which projects light from an image-forming element onto a projection surface and a detecting system which performs a detecting operation, by using light from the projection surface, of a distance to the projection surface or a focusing state of the projection optical system with respect to the projection surface. The detecting system obtains brightness information regarding brightness based on projection light with respect to brightness based on environmental light on the projection surface on the basis of a signal from an light-receiving element which receives light from the projection surface, determines a condition for executing the detecting operation on the basis of the brightness information, and performs the detecting operation in accordance with the condition.

An image-projecting apparatus according to still another aspect of the invention comprises a projection optical system which projects light from an image-forming element onto a projection surface and a detecting system which performs a detecting operation of a distance to the projection surface or a focusing state of the projection optical system with respect to the projection surface by using light from, the projection surface. The detecting system includes light-receiving elements which receive light from a projection area on the projection surface and an outer area other than the projection area, respectively, determines a condition of the detecting operation on the basis of the light-receiving intensity levels of the light-receiving elements of the light from the projection area and the light from the outer area and performs the detecting action in accordance with the condition.

Features and advantages of an image-projecting apparatus according to the invention will be made clearer by the following detailed description with reference to the accompanying drawings.

DETAILED DESCRIPTION OF THE PREFERRED EMBODIMENTS

Hereinafter, a description is given of embodiments of the invention.

Embodiment 1

Figure 1:
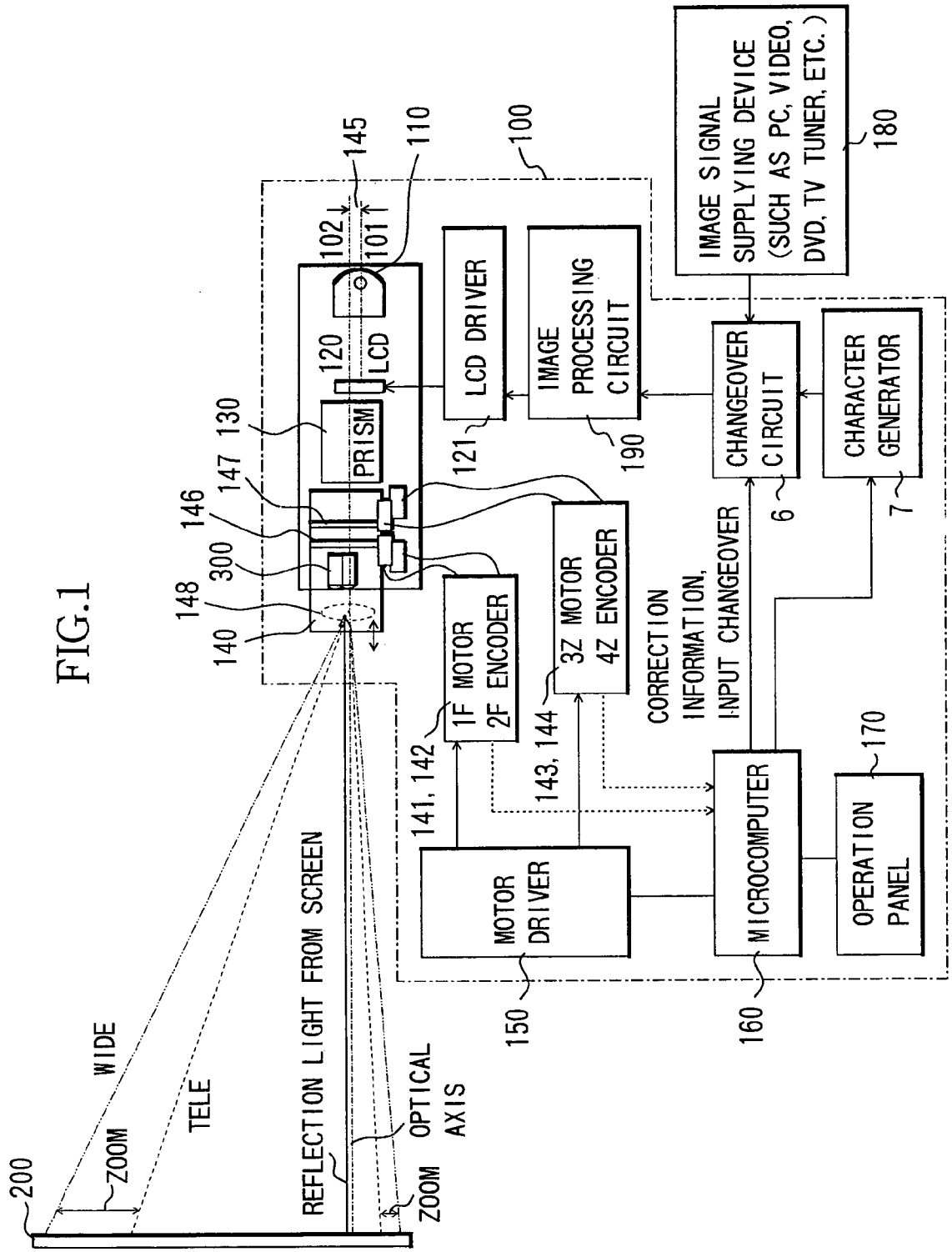
FIG. 1 is a view showing a structure of an AF liquid crystal projector according to Embodiment 1 of the invention.

FIG. 1 shows a structure of 3-plate type liquid crystal projector with an AF (image-projecting apparatus) according to Embodiment 1 of the present invention.

In FIG. 1, reference numeral 100 denotes a liquid crystal projector. Reference numeral 110 denotes a light source, 120 denotes a transmission type liquid crystal display panel, 130 denotes a cross dichroic prism, 140 denotes a zoom projecting lens (projection optical system), 150 denotes a motor driver, 160 denotes a microcomputer operating as a controller, 170 denotes an operation panel, 180 denotes an image signal supplying device such as a personal computer (PC), a video, a DVD player, a television tuner, etc., 190 denotes an image processing circuit, 200 denotes a screen, and 300 denotes a passive AF sensor including a light-receiving element.

The basic structure of the projector 100 is a general structure of a 3-plate type liquid crystal projector. That is, three transmission type liquid crystal display panels 120 are used (in the drawing, the structure of only a channel (panel)

is illustrated), and illumination light from the light source (high pressure mercury vapor lamp, metal halide lamp, Xenon lamp, etc.) 110 is separated into three channels of color light components of red R, green G and blue B by the dichroic mirror (not illustrated) and respectively illuminates the three liquid crystal display panels 120.

The liquid crystal display panel 120 is driven by an LCD driver 121 on the basis of image signals supplied from the image signal supplying device 180, and displays an original image per channel corresponding to the image signals. And, when the separated color light components are made incident into the liquid crystal display panels 120, the light components are modulated in accordance with the original images and emerge from the liquid crystal display panels 120.

The color light components transmitted through the respective liquid crystal display panels 120 are color-combined so that the optical axes are made match with each other in the cross dichroic prism 130, and are enlarged and projected onto the screen 200 by the projecting lens 140.

An optical axis 102 of the projecting lens 140 is shifted upwards (is caused to rise), as shown by reference numeral 145, with respect to an optical axis 101 of an illumination system. Thus, since the lens optical axis 102 is shifted and disposed, an image projected onto the screen 200 is projected upwards of the lens optical axis 102. In the case where a projector is placed on a desk, eclipse of the screen due to the desk can be reduced.

The projecting lens 140 is made into a zoom lens and the projection image angle changes by zooming as shown by the arrow on the screen 200. The distance from the optical axis 102 of the projecting lens 140 to the screen end is proportionally subjected to enlargement and reduction in according to the magnification ratio of zooming, and thus the movement at the screen ends at the lower side near the optical axis 102 is made relatively decrease.

A focus operating ring 146 and a zoom operating ring 147, which include a circumferential gear portion, are provided at the outer circumference of the projecting lens 140. A focusing lens 148 and a magnification lens (not illustrated) are driven by the rotation thereof, and a focusing adjustment and an image angle adjustment respectively is performed.

Output pinion gears of a focusing motor 141 and a zooming motor 143 which are geared motors integrated with a speed reduction unit for electric drive are engaged with the two operating rings 146 and 147. Electric drive is performed by output of the motors 141 and 143. In addition, it is possible to perform zooming and focusing by manual operations of the focus operating ring 146 and zoom operating ring 147.

Potentiometer type rotary encoders 142 and 144 are coupled via pinion gears with the circumferential gear portions of the operating rings 146 and 147 in order to detect the absolute positions thereof (indirectly, the absolute positions of the lens). The rotary encoders 142 and 144 outputs signals which show the current position of the focusing lens 148 and position of the magnification lens to the microcomputer 160.

The focusing motor 141 and zooming motor 142 are controlled for driving by the microcomputer 160 via the motor driver 150.

An image projected by the present projector 100 may be selected from an image based on image signals from the image signal supplying device 180, an image based on image signals from a character generator 7 used for OSD (On-Screen Display) such as a movement mode, which is frequently equipped in current projectors, and an image based on image signals in a memory (not illustrated) by means of a changeover circuit 6. Selected image signals are applied to resolution conversion processing, gamma processing, interlace processing, etc., by the image processing circuit 190 in accordance with the type of image signals and are displayed on the liquid crystal display panel 120 via LCD drivers 121 for respective RGB channels.

The operation panel 170 is disposed on the outer surface of the projector 100 and includes a group of switches disposed in a concentrated manner thereon, which are switches for turning on and off the power source, selecting a source for supplying projection images (that is, original images), performing an electric zooming operation, an electric focusing operation, turning on and off the auto focusing, and setting various types of modes.

Figure 2:
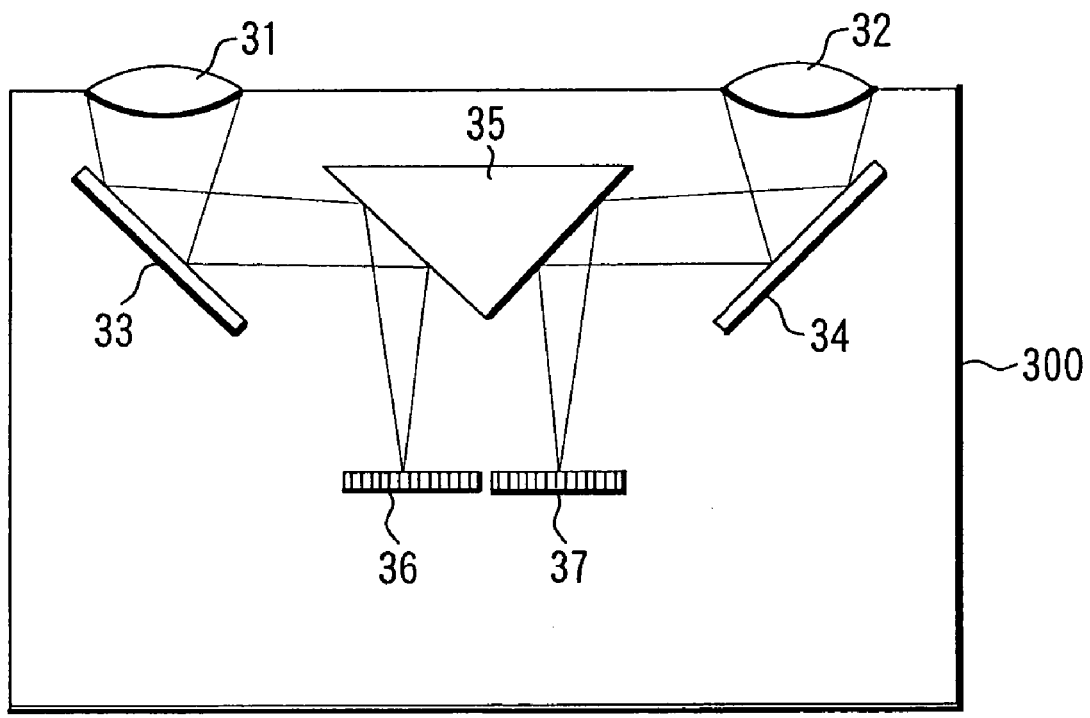
FIG. 2 is a view showing a structure of an AF sensor portion of Embodiment 1.

FIG. 2 shows a brief structure of a passive AF sensor 300 according to the present embodiment. The passive AF sensor 300 receives reflection light from the lower side of an area (projection area) in which an image is projected on the screen 200, that is, both ranges (visual fields) of the projection area and a boundary to an area other than the projection area in which no image is projected.

The passive AF sensor 300 takes in the reflection light through a pair of lens 31 and 32 disposed from each other by a predetermined distance as the base length, and two light fluxes made incident through the respective lenses are reflected by a pair of mirrors 33 and 34 and a pair of reflection surfaces of a prism 35, and are introduced to a pair of line sensors 36 and 37, thereby receiving the reflection light.

And, the passive AF sensor 300 is disposed in the close of the projecting lens 140, and at the same time is disposed so that its base length direction extends in the vertical direction, it straddles a part of the lower side of the image projection area on the screen 200 and the center axis of the field of view is roughly parallel to the optical axis 102 of the projecting lens 140.

By thus the passive AF sensor 300 as shown above is disposed, useless space can be remarkably reduced in terms of space efficiency when disposing the AF sensor unit, which is generally constructed to be a quadratic prism, in the projector 100.

Figure 3:
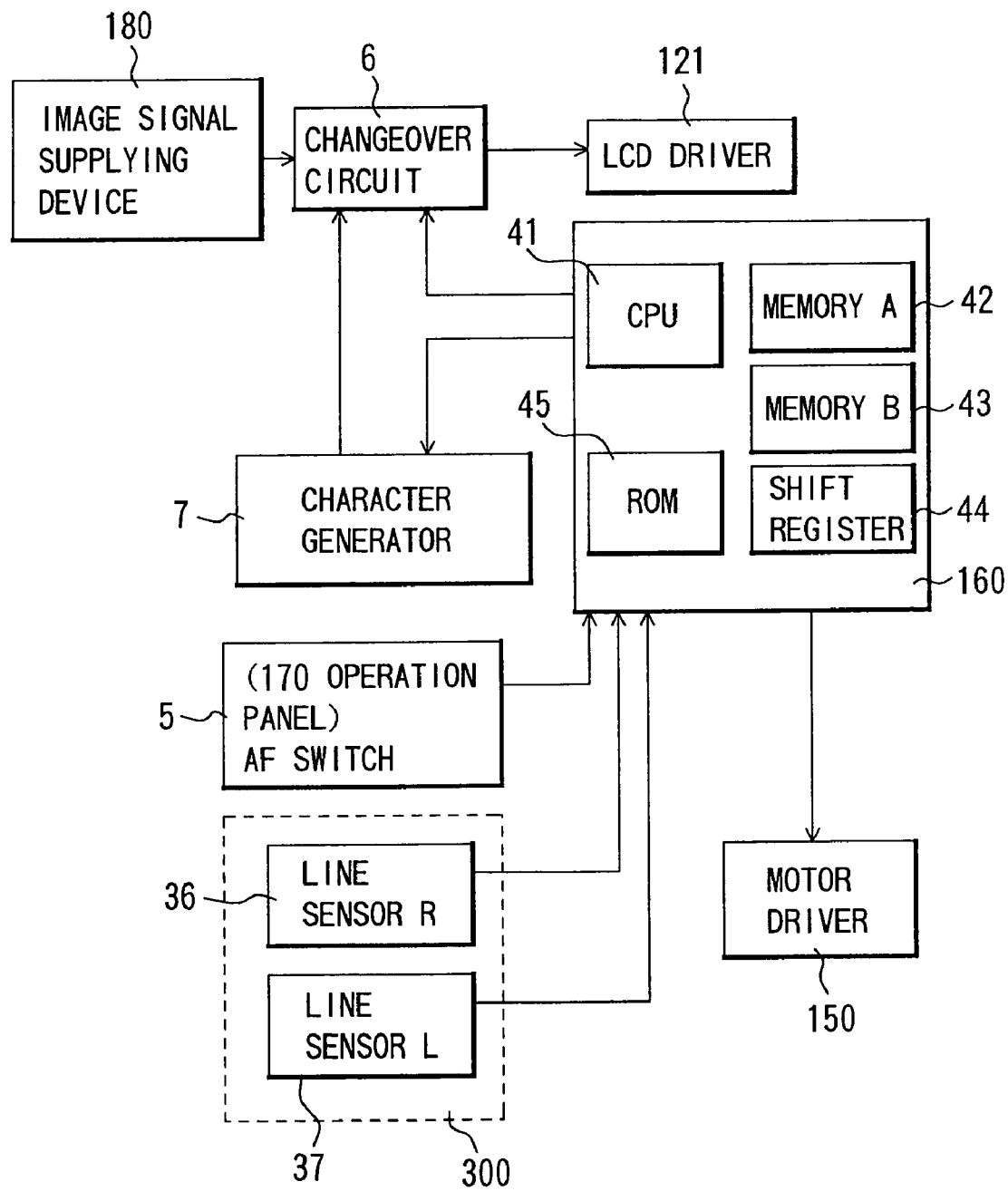
FIG. 3 is a view showing a brief structure of an AF circuit of Embodiment 1.

FIG. 3 shows a circuit configuration regarding AF control which is performed in the projector 100 according to the embodiment.

The microcomputer 160 is in charge of entire control of the present projector 100, and at the same time is in charge of AF control. The microcomputer 160 includes a memory A42, a memory B43, a shift register 44 and a ROM 44 in addition to a CPU 41 (The microcomputer 160 and passive AF sensor 300 correspond to the detecting system.).

Output (for example, voltage value) of respective pixels (a plurality of pixels of the respective line sensors 36 and 37 shown in FIG. 2) is converted to, for example, 8-bit digital signals (information) by an A/D converter (not illustrated). Further, by varying accumulation time and gain in the respective pixels in accordance with signal levels outputted by the respective pixels, it is possible to prevent the accumulation of respective pixels from being saturated, and a dynamic range of signals can be enlarged.

Here, the memories A42 and B43 individually store image signals (the digital signals) photo electrically converted by the line sensors 36 and 37 of the above passive AF sensor 300.

Image data of, for example, the memory A42 are inputted into the shift register 44, and the shift register 44 operates so that the inputted data are caused to be sequentially shifted.

And, the CPU 41 compares the data of the shift register 44 with that of the memory B43 and detects that both the data are made match with each other, the CPU 41 collates the shift amount with the content of the ROM 45, and the distance to the screen 200 is thereby obtained. Then, the CPU 41 transmits an output to drive the focusing lens 148 (Refer to FIG. 1) to the motor driver 150.

Herein, the ROM 45 stores, as table data, the relationship between the shift amount of the shift register 44 and the distance to the screen 200. Also, such a structure may be employed, in which a plurality of table data are prepared, a table can be selected by using temperature as a parameter, and a fluctuation in focusing due to temperature changes can be decreased by selecting a table for calculating a lens drive amount and a table for drive amount calculation coefficients with a temperature sensor (not illustrated) disposed in the close of the passive AF sensor 300 in the projector 100.

Thereby, it is possible to secure satisfactory AF accuracy in a projector where a temperature rise is liable to occur.

Reference numeral 5 denotes an AF switch which is provided on the operation panel 170. An operation of the AF switch 5 is transmitted to the changeover circuit 6 via the microcomputer 160. Responding to an operation of the AF switch 5, the changeover circuit 6 changes over image signals, which are the base of original images displayed on the liquid crystal display panel 120, from video signals to signals for displaying a projection image employing a hardware background generating function of the character generator 7.

In this case, the character generator 7 transmits image signals showing an entirely white image not having a background-free character display pattern, entirely gray image or an AF detection image equivalent thereto to the LCD driver 121 in accordance with a command of the microcomputer 160, and causes the liquid crystal display panel 120 to display an original image for detection corresponding to the AF detection image.

Next, a description is given of an AF operation in the projector 100 constructed as described above. It is recommended that the AF operation is performed in advance of ordinary projection display of video images.

First, when the AF switch 5 provided on the operation panel 170 is operated, output of the character generator 7 is selected by the changeover circuit 6, and the microcomputer 160 transmits the output of the character generator 7 to the LCD driver 121. Consequently the AF detection original image is displayed on the liquid crystal display panel 120, and the AF detection image is projected on the screen 200.

Herein, the optical axis 102 of the projecting lens 140 is shifted to the position where such a ratio is obtained, that is, the ratio in the vertical (up and down) dimensions in the effective display range of the liquid crystal display panel 120 is 1 for up and 19 for down. Therefore, the projection image on the screen 200 shifts so that such a ratio is 19 for up and 1 for up with respect to the optical axis 102 of the projecting lens 140, and the image is projected with an appearance elevation angle so that no distortion is provided.

And, the angle of view of the passive AF sensor 300 is set to approximately 10 degrees in the base length direction, and the lower side of the projection image is included in the field of view.

At the boundary between the projection area (in the screen) of an image on the screen 200 and an area other than the projection area outside thereof (outside the screen), an entirely white image having maximum brightness, which can be projected, and an area outside the screen having lower brightness than in a case where a black-level image is projected are adjacent to each other.

Here, general characteristics of a transmission type liquid crystal display panel 120 are used in the present embodiment where the black-level image is brighter than the area outside the screen. This is because there exists leakage light even in a case of an entirely light-shielded state. Also, in the screen, flare brought about by the projecting lens 140 and leakage light around the dichroic prism 130 necessarily brighten the black-level image.

These factors of lowering the contrast resulting from the optical system exist as well in any image display elements such as, for example, reflection type micro-mirror drive elements, reflection type liquid crystal display element such as LCOS, etc., and spontaneous light type image display elements such as an EL element, etc., other than the transmission type liquid crystal display elements. Therefore, in a projector using these image display elements, generally, the black-level portion in the screen always is brighter than outside the screen.

On the other hand, the lower side of a projection image is located in the close of the lens optical axis 102 and is a place, free from any attenuation of the surrounding light amount, where it is easy to obtain the brightest white display in the entire projection screen.

Therefore, if a sensor output is obtained with the position included in the field of view of the sensor, the boundary shows the highest contrast obtainable by projection of the projector. In addition, even in a case where the projection image is an entirely gray image, since the brightness of the area outside the projection is low, it is possible to obtain a sufficiently high contrast in the field of view.

Also, as described above, since a fluctuation in position of the lower side of the screen is slight if the projecting lens 140 is subjected to zooming between the tele end and wide end, the boundary is always included in the field of view of the sensor without vertically adjusting the center (optical axis) in the base length direction of the sensor field of view.

The reflection light thus made incident into the passive AF sensor 300, which is from the sensor field of view, is received by the line sensors 36 and 37 via the lenses 31, 32, mirrors 33, 34 and prism 35, respectively.

And, image signals photo electrically converted by respective pixels of the line sensors 36 and 37 are stored in the memory A42 and memory B43 of the microcomputer 160, respectively.

FIGS. 4A, 4B 4C, 4D, 4E, 4F, 4G, and 4H show a two-image correlation distance detection method by using a correlation between two images formed in the line sensors 36 and 37.

Figure 4B:
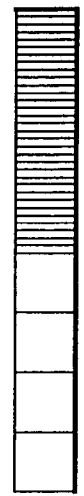
FIGS. 4A, 4B, 4C, 4D, 4E, 4F, 4G, and 4H are a descriptive view of a two-phase correlation distance-detection method.
Figure 4D:
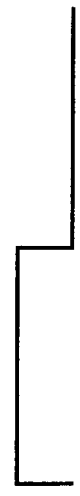
Figure 4F:
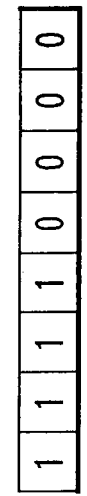
Figure 4A:
Figure 4C:
Figure 4E:
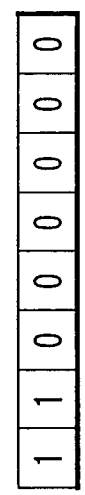

Images in the field of view are formed, as shown in FIG. 4(a) and FIG. 4(b), in the line sensor 36 and line sensor 37, respectively. Signals as shown in FIG. 4(c) and FIG. 4(d) are outputted from a group of pixels which comprise respective line sensors, and image information as shown in FIG. 4(e) and FIG. 4(f), corresponding to the output signals shown in FIG. 4(c) and FIG. 4(d) are stored in the memory A42 and memory B43, receptively.

Figure 4G:
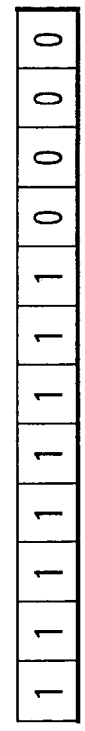

And, the information of the memory A42 of the above are inputted in the shift register 44 as shown in FIG. 4(g), and the content of the shift register 44 is shifted in order in the direction of the arrow in the drawing.

Figure 4H:
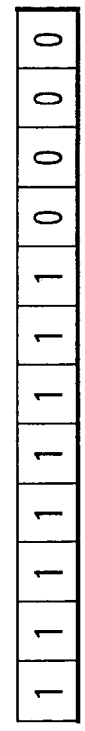

In this state, the CPU 41 compares the information pattern of the shift register 44 with the information pattern (Refer to FIG. 4(h)) of the memory B43, wherein if coincidence of both the information patterns are detected by determination methods of minimizing the publicly known difference (=OR-AND), maximizing of AND, and minimizing of OR, etc., the shift amount at this time is collated with the memory content of the ROM 45, and the distance to the screen is obtained.

As necessary, difference amounts of pixel information adjacent to each other are obtained as information for collation and comparison, and a correlation comparison process (differentiation processing) is performed, whereby accuracy of the optical distance detection employed in the present embodiment is improved.

The information for obtaining the difference may be based not only on the adjacent information, but also may be based on the information with one pixel skipped or "n" pixels skipped. In addition, a group of information in which a plurality of consecutive information in a predetermined interval are added is calculated, and a correlation comparison processing may be performed.

Further, by outputting thus obtained distance information to the motor driver 150, the focusing lens 148 (Refer to FIG. 1) is driven to perform a focusing operation (that is, focusing adjustment).

Thus, an image generated by a hardware in advance is selected, and the image is projected onto a screen 200. After that, AF control is performed. Thereby, it is possible to remarkably improve the accuracy (focusing accuracy) in focusing adjustment without using excess memory, and it is possible to reduce the burden in terms of production costs.

Also, in the present embodiment, a description was given of a case where AF control is performed by projecting a hardware-generated image by means of the OSD (On-Screen Display) character generator 7 standard-equipped as a function of a projector for AF detection. However, AF control can be performed as well in a case where a DVD moving image and a computer monitor image based on image signals from the image signal supplying device 180, such as ordinary video images, etc., are projected.

Figure 5:
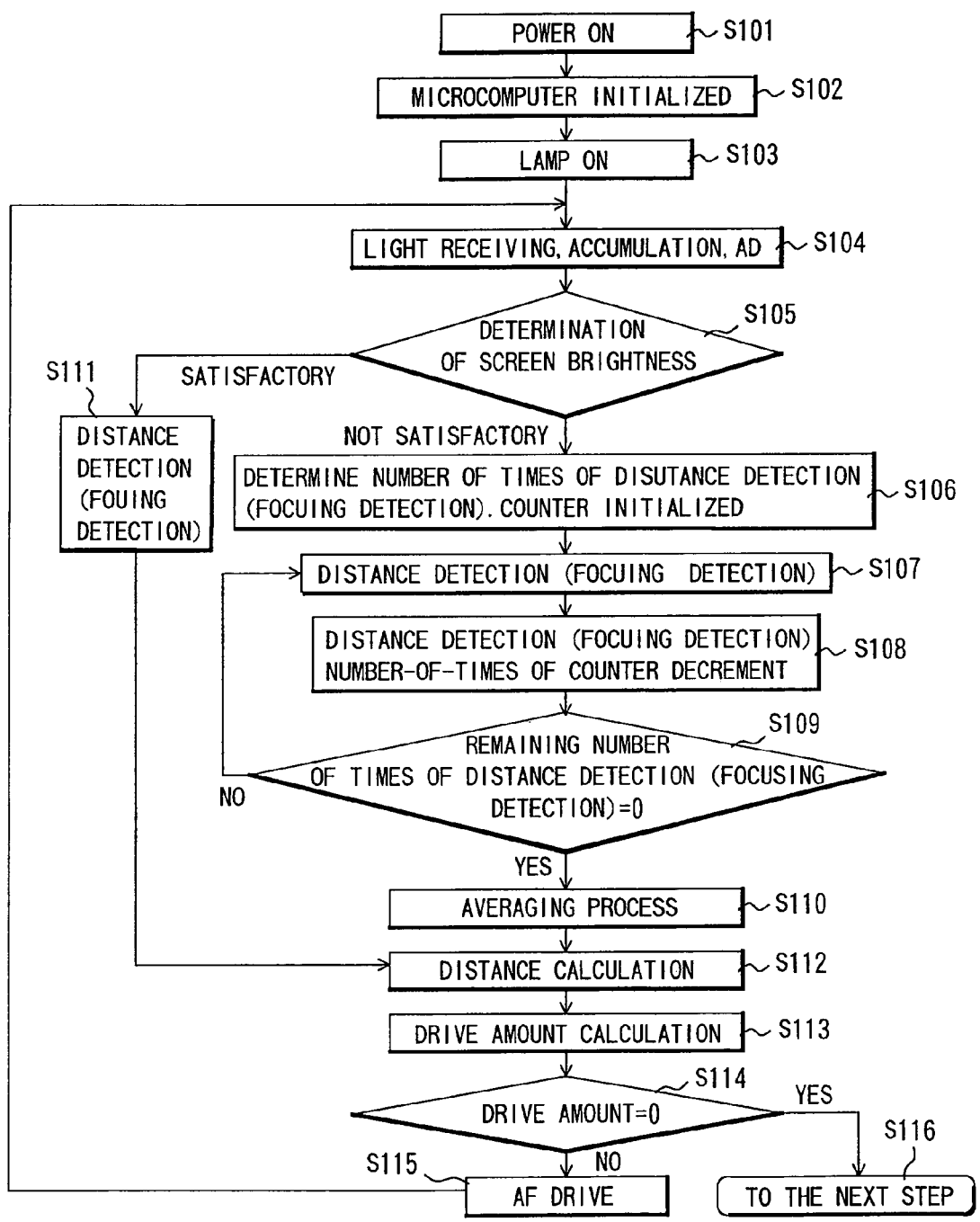
FIG. 5 is a flowchart showing operations of Embodiment 1.

FIG. 5 is a flowchart showing an AF operation in the embodiment. Hereinafter, using the drawing, a description is given of operations regarding the AF operation of the microcomputer 160 (CPU 41)

In FIG. 5, when the power source switch of the operation panel 170 is turned on (Power ON) (Step (hereinafter called "S") 101), the microcomputer 160 is performed initializing operation (S102). After that, a light source control circuit (not illustrated) is started, high voltage necessary to turn on the light source 110 (herein, a high pressure mercury lamp is employed) is generated by actuating a stabilizer (not illustrated), and the high voltage is applied to the electrode of the light source 110, whereby lighting of the light source 110 is commenced (S103).

After the light source 110 is turned on, until the changeover circuit 6 changes the mode to an external input image in the period of steps shown in FIG. 5, an entirely white image based on the function of the character generator 7 is projected on the screen 200, or characters showing the initial mode of, for example, "under preparation" are projected outside the field of view of the passive AF sensor 300 with the entirely white image used as the background.

A projection image (the initially projecting image) at this time is automatically executed by a publicly known circuit in accordance with the present flowchart. After that, the projection image is changed over to the external input image by inputting image signals from an external device (the image signal supplying device 180) by the changeover circuit 6 shown in FIG. 3, automatically when detecting elapse of a predetermined period of time or detecting predetermined brightness is reached when monitoring the brightness rise of the light source 110 after the first AF drive is completed, or optionally by a user operating an input selection button (not illustrated), which is provided on the operation panel 170.

By making the image changeover possible by receiving such an operation by a user, when the projector 100 is located in a meeting room, etc., in a stationary state and no initial preparation is required, the need of a user in terms of checking the content of a projection image as early as possible can be satisfied.

In addition, as has been described with reference to FIG. 2, when the AF switch provided on the operation panel 170 is operated from time to time, an output of the character generator 7 is selected again by the changeover circuit 6, and the microcomputer 160 transmits the output content of the character generator 7 to the LCD driver 121.

With the interrupt processing, the original image for AF detection is displayed on the liquid crystal display panel 120, and the image for AF detection is projected on the screen 200. In this case, the processing is made into a loop commencing from S104 described later in order to ensure subsequent operations.

In S104, the passive AF sensor shown in FIG. 1 and FIG. 2 is caused to receive reflected light from the underside of an area (projection area) on which an image is displayed on the screen 200, that is, an area including both the projection area and the boundary to an area other than the projection area, in which no image is projected, and electric charge is accumulated for pixels of at least one of the line sensors 36 and 37, and the electric charge is performed A/D conversion. Further, brightness in the image and outside the image is determined based on the A/D converting value (light-receiving intensity level) (S105). That is, in the embodiment, the passive AF sensor 300 is concurrently used as a light-receiving element for performing the brightness determination.

Here, since light from the projection area in the field of view established on the screen 200 and light from an area other than the projection area are made incident onto the line sensors, it is possible to detect the brightness of the projection area on the screen 200 (that is, the brightness of the sum of projection light from the projecting lens 140 and environmental light existing on the screen 200 and in its peripheral projection environment, which is light other than the projection light,) and the brightness in an area other than the projection area (the brightness based on the environmental light). And, in the embodiment, brightness ratio information (in other words, differential information of the light-receiving intensity level) showing the relationship between the brightness based on the environmental light on the screen 200 and the brightness based on the projection light is obtained from the detected brightness.

For example, where the brightness (herein, illumination) of the projection area is 2000 1x and that of an area other than the projection area is 500 1x, the brightness based on projection light becomes 15000 1x (=2000 1x−500 1x), and the brightness based on environmental light becomes 500 1x. Therefore, the brightness ratio=brightness based on projection light to brightness based on environmental light becomes 3:1.

Also, the brightness ratio obtained herein may show a ratio of the brightness of a projection area (brightness based on the sum of the projection light plus the environmental light) to the brightness of an area other than the projection area (brightness based on the environmental light). In the detailed example, the brightness of a projection area to the brightness of an area other than the projection area becomes 4:1.

And, the obtained brightness ratio (for example, 3:1) is collated with a determination threshold table stored in the memory (ROM 45) of the microcomputer 160.

Figure 6:
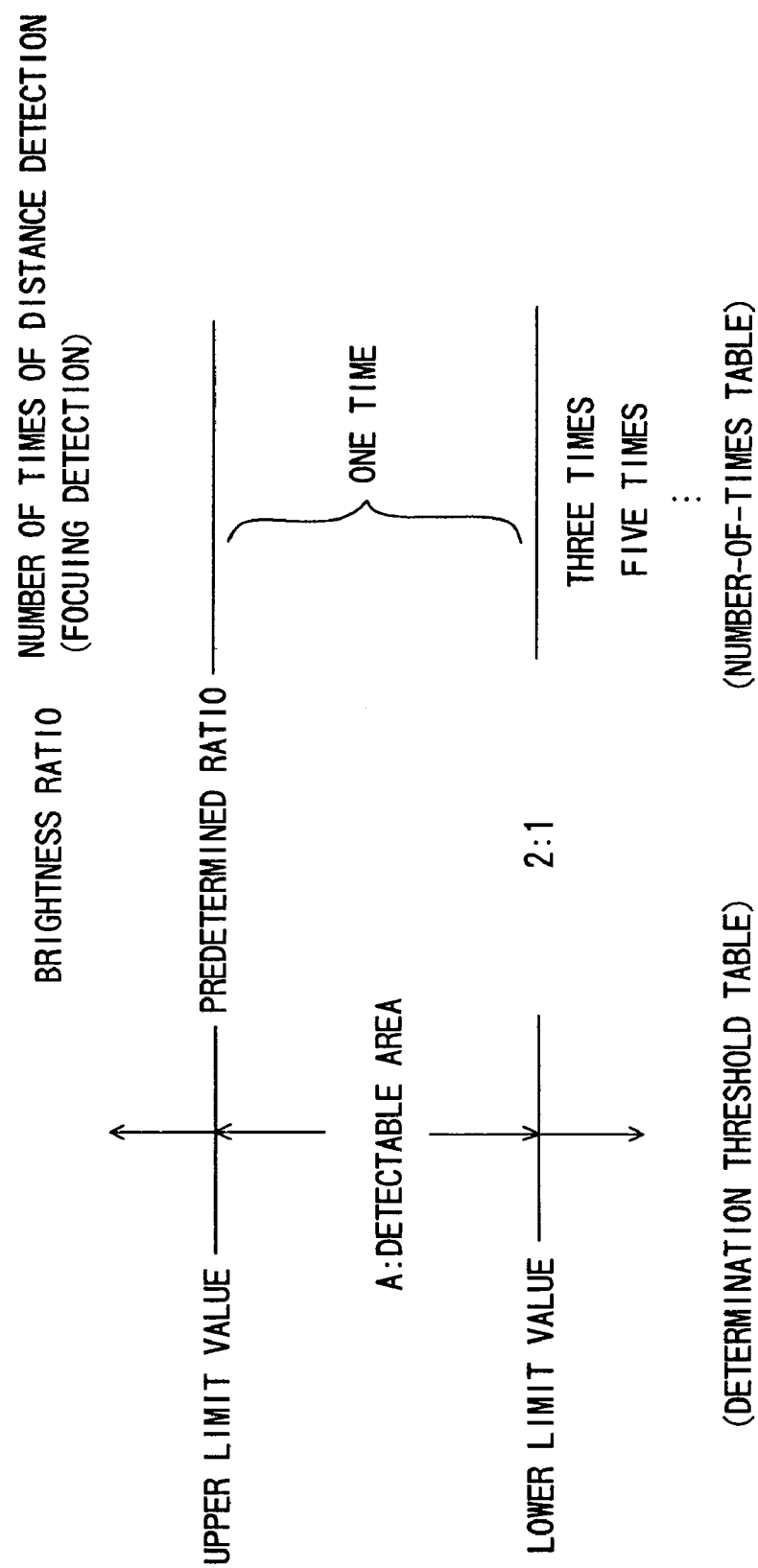
FIG. 6 is a conceptual view showing setting of the number of times of distance-detection in Embodiment 1.

Herein, FIG. 6 shows a conceptual view of the determination threshold table. Reference symbol A in the drawing shows a detectable area in which a ratio of 2:1 of the range which the brightness ratio can take is made into a lower limit value, and a predetermined ratio is made into an upper limit value, and the area is an area in which a contrast suitable for the above mentioned distance detecting operation can be obtained.

Further, the lower limit value referred to herein is only an example, and it may be subjected to another value. In addition, both the lower limit value and upper limit value may be variable. Also, where the brightness ratio is obtained as a ratio of the brightness of the projection area to the brightness of an area other than the projection ratio, for example, 4:1 may be employed as the lower limit value.

And, where the obtained brightness ratio is in the detectable area A (for example, the brightness ratio is 3:1), the process advances to S111 since it is a satisfactory brightness ratio, and the distance detecting operation is performed only one time which is the minimum number of times of distance detecting operation (that is, the number of times of distance detection is determined to be one time). And, by using the distance detection result, the distance to the screen 200 is calculated (S112).

On the other hand, where the brightness ratio is outside the detectable area A (for example, where the brightness ratio is 1.5:1), the process advances to S106 because it is an unsatisfactory ratio, wherein the smaller the brightness ratio is (that is, the further apart the brightness ratio is from the detectable area A or the higher the light-receiving intensity level of the environmental light of an area other than the projection area is), the greater the number of times of distance detection is determined. Also, in this Step, a counter (not illustrated) in the microcomputer 160, which counts the number of times of distance detecting operation, is initialized (is set to 0).

A table of the number of times shown in FIG. 6, which is stored in a memory (ROM 45) of the microcomputer 160 is used for determination of the number of times of distance detection. In the table of the number of times is shown the relationship between the brightness ratio outside the detectable range A and the number of times of distance detection. The number of times of distance detection is determined by reading out the number of times of distance detection responsive to the brightness ratio from the table of the numbers of time.

Accordingly, for example, the smaller the brightness ratio is below 2:1, the greater the number of times of distance detection is determined to be 3 times, 5 times or the like.

In cases where the brightness based on the projection light is short in comparison with the brightness based on the environmental light and the brightness ratio becomes lower than 2:1, the projector 100 is farther than the use distance based on the specification thereof and is apart from the screen 200 or the size of the projection screen is remarkably large, and the brightness on the screen by the projection light becomes darker than 250 1x, or the brightness based on the projection cannot be detected, since the distance detection accuracy is lowered, the number of times of distance detection is increased.

Also, if the brightness ratio exceeds a predetermined value (the upper limit value) and is large, distance detection is not performed on the basis of the brightness ratio which does not usually occur.

Also, the minimum number of times of distance detection and increasing the number of times of distance detection are merely examples. They may be other numbers of times or may be variable.

When the number of times of distance detection is determined in S106, the process advances to S107, wherein the distance detecting operation is performed. Whenever the distance detecting operation is performed, the measured value is stored in a RAM (not illustrated) in the microcomputer 160, and at the same time, the counter value (the remaining number of times of distance detection) is decreased by one (S108). And, until the counter value becomes zero in S109, distance detecting operations are repeatedly performed, the distance detection values (S107) are repeatedly stored, and the counter value is repeatedly decreased (S108).

When the counter value becomes zero in S109, an averaging process of the distance detection values in respective times, which are stored in the RAM, is performed in S110 by a publicly known method, wherein the distance to the screen 200 is calculated on the basis of the average-processed distance detecting information (S112).

The process advances from S112 to S113, wherein the motor drive amount is calculated on the basis of the distance to the screen 200, which is calculated in 3112, and the present position information of the focusing lens 148, which is detected by the focusing encoder 142, and a determination processing of the drive amount is executed (S114).

Where the drive amount is zero, since the focusing is achieved, the process advances to the next step (S116) (for example, image signals are taken in from the image signal supplying device 180 by changing over and actuating the changeover circuit 6). If the drive amount is not zero, the focusing motor 141 is driven while monitoring the position of the focusing lens 148, which is detected by the focusing encoder 142, and focusing adjustment is performed (S115). And, the process returns to S104.

Also, although, in the embodiment, a description is given under an assumption that detection of the distance to the screen 200 based on output from the passive AF sensor 300 is "distance detection," it is also possible to detect a defocus amount (focusing state) of the projecting lens 140 based on a phase-difference detecting method by a two-image correlation calculation by the passive AF sensor 300. And, it is possible to calculate a drive amount of the focusing lens 148 for focusing on the basis of the defocus amount. Therefore, by placing "detection of the focusing state (focusing detection)" instead of "distance detection" in FIG. 5, it is possible to perform an AF operation by a so-called phase-difference detecting method.

In addition, in the present embodiment, it is also possible to perform AF (Auto-Focusing) of a so-called contrast detecting method (hill climbing method). In this case, although focusing is obtained by searching for the position of the focusing lens 148, at which the maximum peak value of high frequency components of the output signals from the passive AF sensor 300 are obtained, while driving the focusing lens 148, a position searching operation of the focusing lens 148, at which the maximum peak value is obtained, is performed one time when the brightness ratio is in an intermediate area. On the other hand, it is performed a plurality of times when the brightness ratio is outside the intermediate area (a greater number of times the further apart from the intermediate area). An average position of the searched positions stored in respective times may be made into the finally in-focus position.

Embodiment 2

Figure 7:
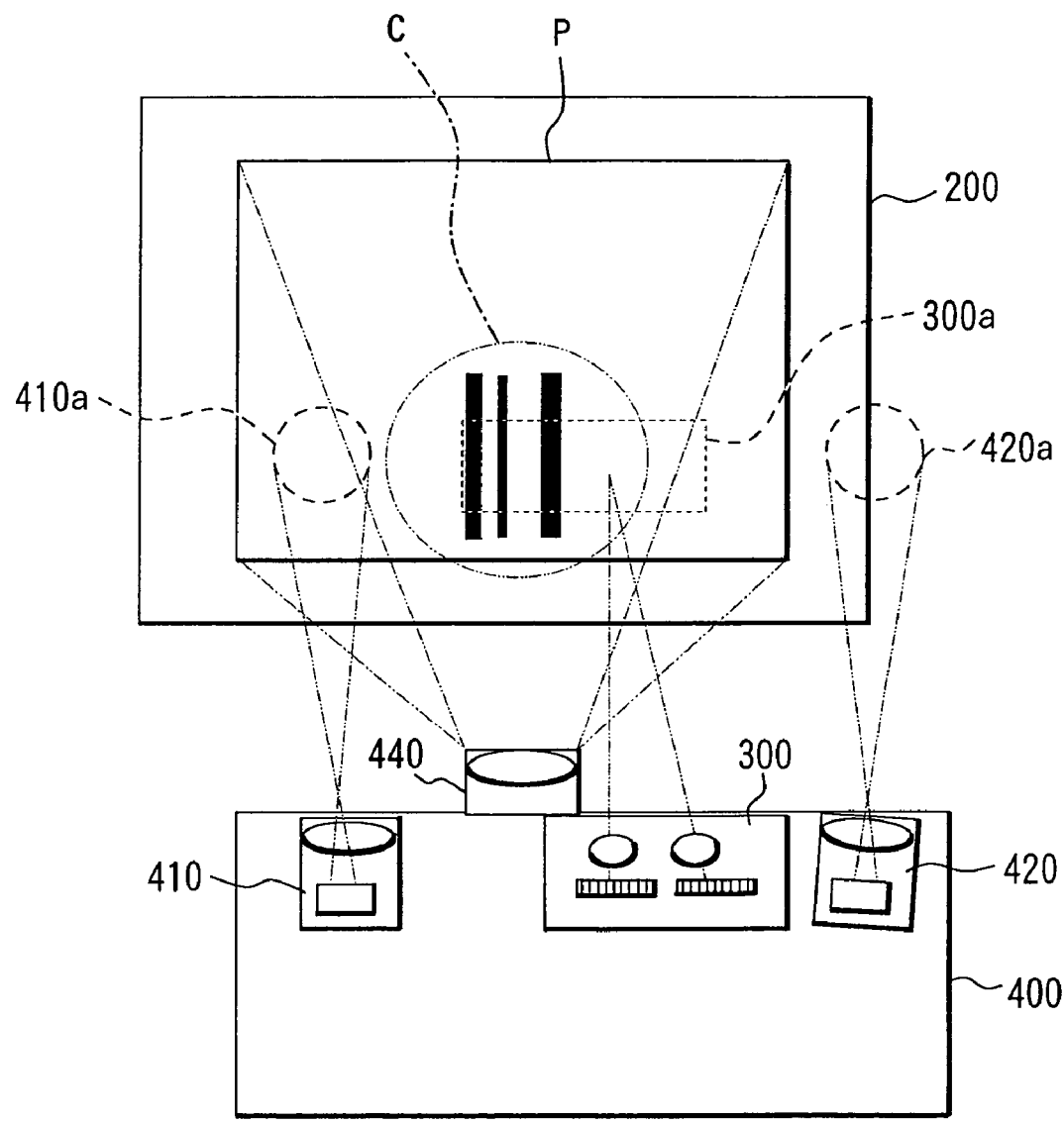
FIG. 7 is a view showing a structure of an AF liquid crystal projector according to Embodiment 2 of the invention.

FIG. 7 shows a structure of a 3-plate type liquid crystal projector (image-projecting apparatus) with an AF feature according to Embodiment 2 of the present invention.

Although, in Embodiment 1, a description was given of a case where a passive AF sensor for distance detection (or focusing detection) is used both as a sensor for detecting the brightness in a projection area and an area other than the projection area, in Embodiment 2, an exclusive brightness detection sensor is employed.

In FIG. 7, reference numeral 400 denotes a projector, 440 denotes a projecting lens, and 300 denotes a passive AF sensor which is similar to that of Embodiment 1.

Reference numeral 300a denotes a field of view of the passive AF sensor 300, and reference symbol C denotes an AF chart projected from the projecting lens 440 so that a part thereof is included in the field of view 300a.

Reference numeral 410 denotes a projection area light-receiving intensity sensor (the first light-receiving element) which receives reflected light from a projection area P of an image made by the projecting lens 440 on the screen 200 and outputs signals in accordance with the brightness (that is, the light-receiving intensity level) Reference numeral 410a denotes a field of view (a range on the screen 200 onto which light received by the sensor 410 is reflected) of the light-receiving intensity sensor 410 in the projection area. In the present embodiment, an image is projected on the screen 200 so that the AF chart C is displayed in the close of the optical axis position of the projecting lens 440 with a white image used as the background. The field of view 410a of the light-receiving intensity sensor 410 in the projection area is set in the close of the side (the range not including the AF chart C) of the AF chart C of the projection area P.

Further, reference numeral 420 denotes a light-receiving intensity sensor outside the projection area (the second light-receiving element), which receives reflected light from an area other than the projection area (an area outside the projection area P) and outputs signals in accordance with the brightness (that is, the light-receiving intensity level). Reference numeral 420a denotes a field of view (in the present embodiment, the screen 200 and range outside the screen, onto which light received by the sensor 420 is reflected) of the light-receiving intensity sensor 420 outside the projection area.

In the present embodiment, the relationship (brightness ratio) between the brightness of projection light from the projecting lens 440 and brightness based on the environmental light is obtained on the basis of output from the light-receiving intensity sensor 410 in the projection area and output from the light-receiving intensity sensor 420 outside the projection area, and the number of times of distance detection (or focusing detection) is determined by a method similar to that of Embodiment 1 on the basis of the brightness ratio described above.

Embodiment 3

Figure 8:
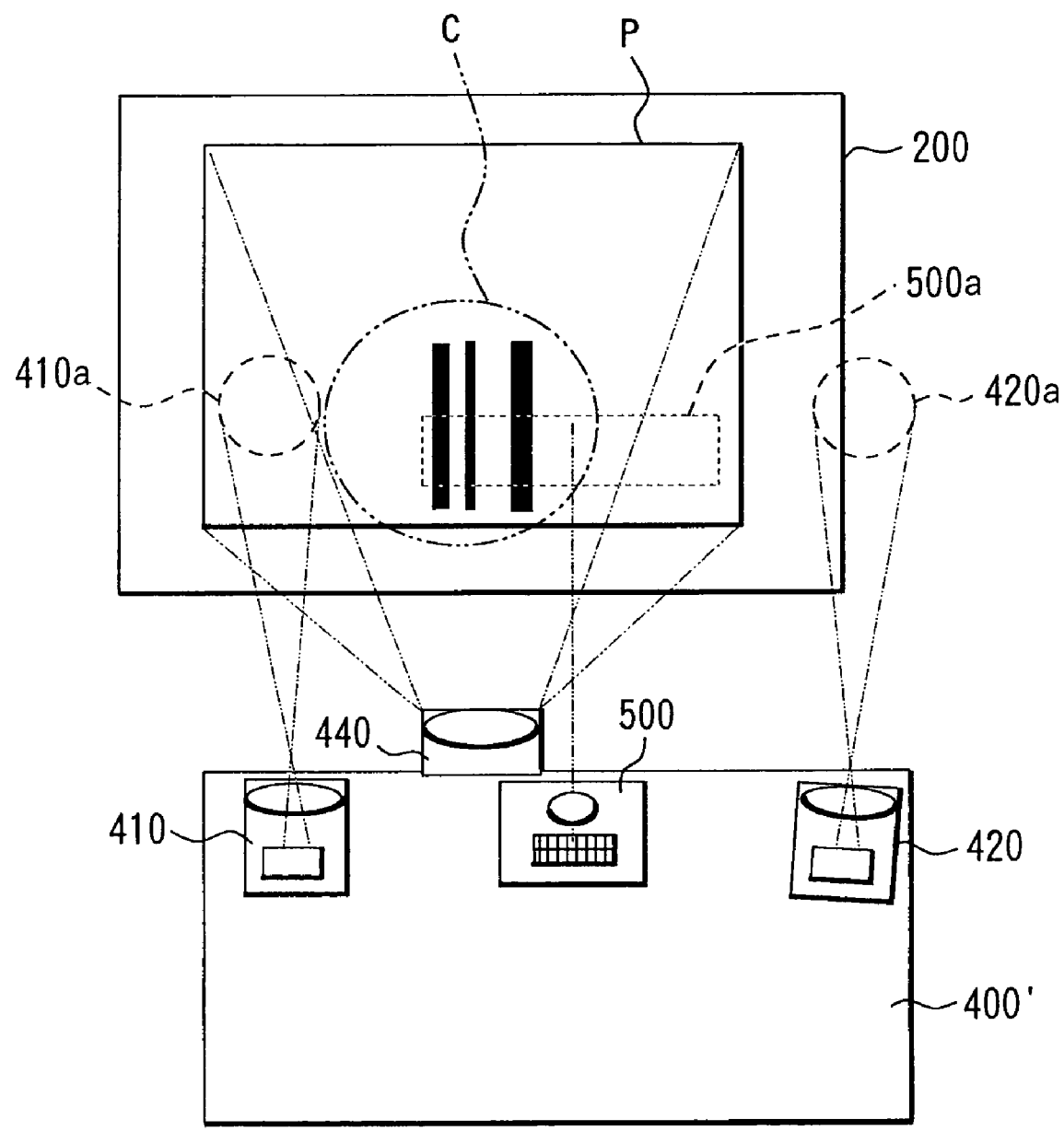
FIG. 8 is a view showing a structure of an AF liquid crystal projector according to Embodiment 3 of the invention.

FIG. 8 shows a structure of a 3-plate type liquid crystal projector (image-projecting apparatus) 400' with an AF according to Embodiment 3 of the invention.

In the present embodiment, a sharpness detecting method (a so-called "blurring method" or "contrast detecting method") is employed as an AF method. A sharpness detection type AF sensor 500 is employed instead of the two-image correlation detection type AF sensor 300 shown in Embodiment 1.

Reference numeral 500a denotes a field of view of the AF sensor 500. The field of view 500a is established so that it includes a part of the AF chart C projected from the projecting lens 440.

And, in addition to the AF sensor 500, the light-receiving intensity sensor 410 in the projection area and light-receiving intensity sensor 420 outside the projection area, which are described in Embodiment 2, are employed. Also, elements which are the same as those in Embodiment 2 are given the same reference numerals. Herein, overlapping description thereof is omitted.

Operations of the projector 400' in the present embodiment, are as additionally described in Embodiment 1.

Embodiment 4

In Embodiments 1 to 3 described above, a description was given of the case where the brightness in the projection area of an image and that in an area other than the projection area are detected, and the relationship (brightness ratio) between the brightness based on the projection light and brightness based on the environmental light are obtained on the basis of the detection results. However, even if the brightness outside the projection area is not necessarily detected, it is possible to obtain the brightness ratio described above. Hereinafter, a description is given of this point.

Figure 9:
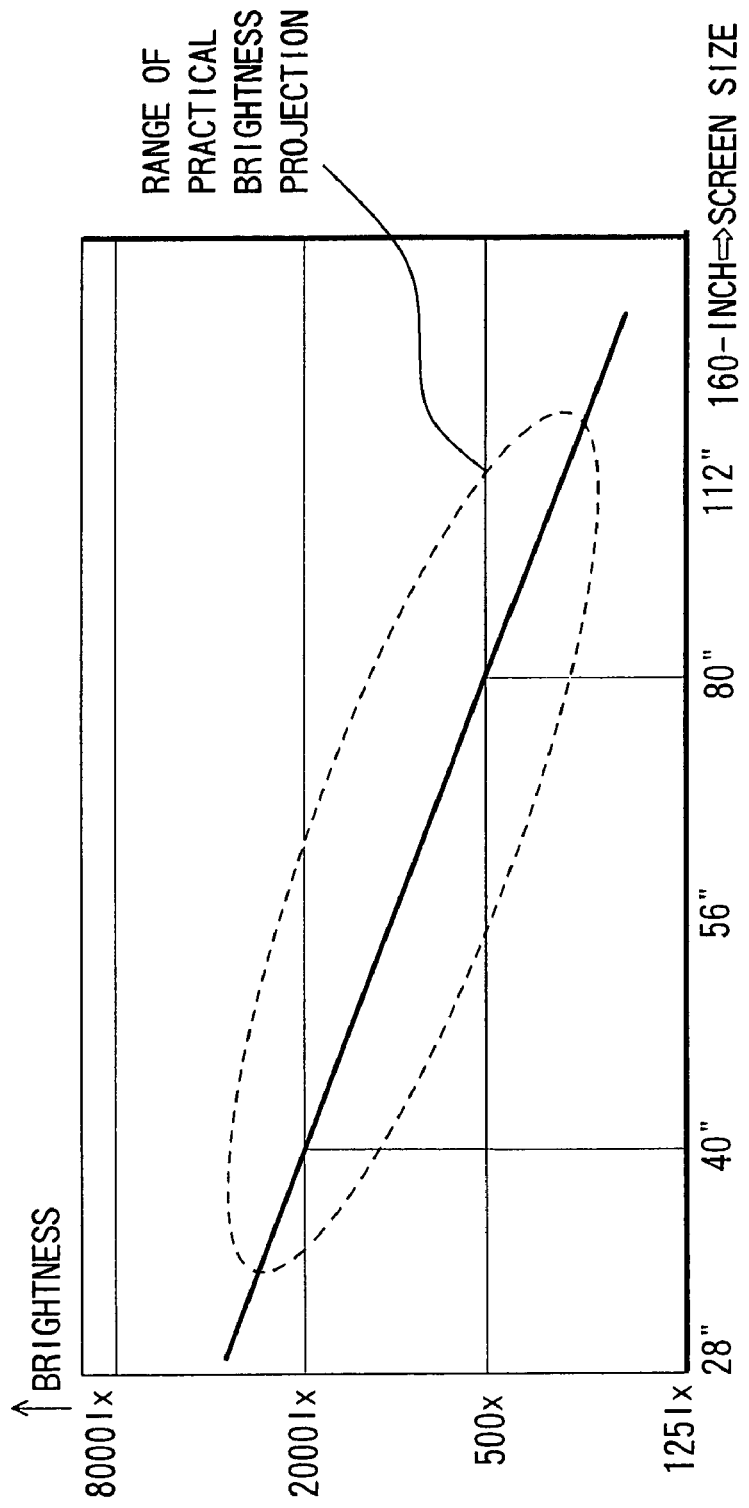
FIG. 9 is a descriptive view of brightness of a projector screen.
Figure 5:
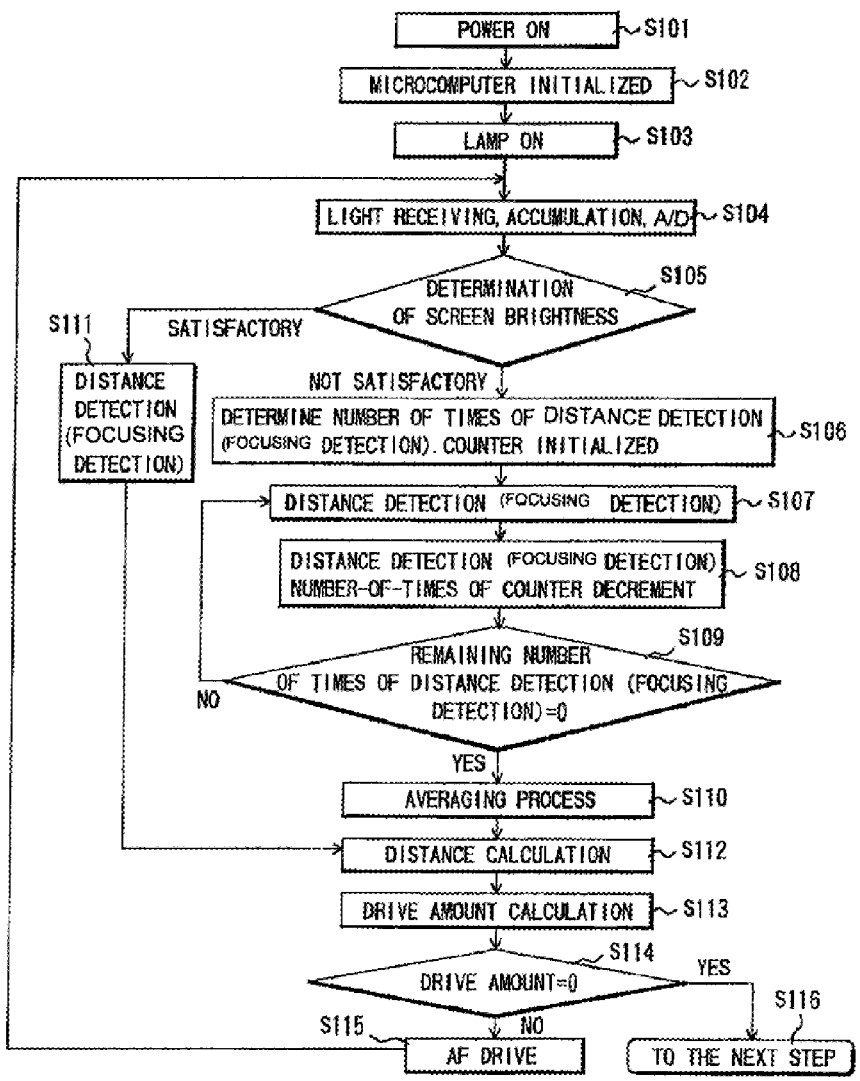
Figure 6:
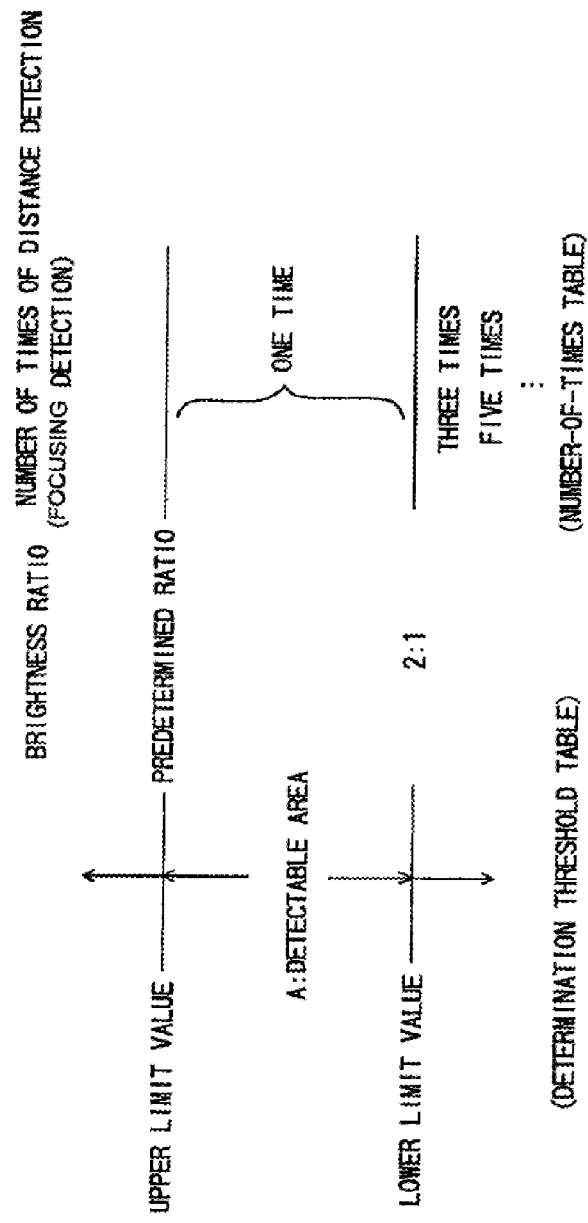

FIG. 9 is a view describing projection brightness of a projector. The drawing shows that an ordinary projection distance in a small-sized projector whose projection brightness is 1000 ANSI1m is limited to a limited distance due to the projection brightness and screen size. In detail, if definite consideration is taken into a case where the practical brightness projection range is 40 to 100 inches, the brightness based on projection becomes 2000 1× through 250 1×.

For this reason, where the brightness obtained by detecting the projection image of a white screen is equivalent to 4000 1×, the brightness based on projection light at an ordinary use distance becomes half thereof at maximum, and the brightness based on the environmental light becomes half or more.

Since the contrast becomes lower if the environmental light further brightens, the number of times of distance detection (focusing detection) is increased. In this case, warning of the surrounding environment being too bright may be issued by a display or with a sound.

Determination of the maximum brightness environment may be performed only by detecting the brightness in the screen. In this case, the white/black contrast on the screen becomes lower than 2:1.

Further, if the detected brightness is from 2000 to 4000 1×, there are various possibilities in which the environmental brightness is from zero to 3750 1×. Further, if the detected brightness is from 250 to 2000 1×, there are various possibilities in which the environmental light is from zero to 2000 1×.

In these ranges, where the brightness is determined by measurement of brightness in and outside the screen with the environmental light eliminated, and the brightness ratio is 2:1 or more, it is determined that the brightness is in the detectable area A, distance detection (focusing detection) is performed by the least number of times. Where the brightness ratio is 2:1 or less and where the detected brightness is 250 1× or less and becomes a darker value, the detection accuracy is further lowered. Therefore, the number of times of distance detection (focusing detection) is increased. At this time, warning of a long distance projection may be performed by a display or with a sound.

As described above, in use conditions of the projector,
Brightness in the screen during image projecting=Brightness based on projection light at an ordinary use distance+brightness based on the environmental light not hindering the image projection falls into a predetermined range. And, if a projection image is made into an entirely white image which becomes the maximum brightness by a projector or made into a chart in which a black pattern is partially placed in a white background, the projection brightness falls into a further definite value, wherein the predetermined range is further narrowed.

Therefore, since it can be detected by evaluating the absolute value of the brightness that, if the brightness is detected which cannot be reached without the environmental light more than a predetermined level which is bright such a window in the daytime, the contrast is low from before distance detecting operation (focusing detecting operation), the number of times of distance detection (focusing detection) is increased, and the focusing accuracy can be improved.

Also, in the case where a brightness range (the detectable range A) is detected which is darker than in the predetermined range and is brighter than the brightness obtained by a projector at an ordinary use distance in a darkroom environment, if it is assumed that the projection distance is an ordinary distance (which it can be conceived that a probability of using a projector at least under conditions which a user considers that "Perform" is high) suitable for image projection, it is understood in advance that the environmental light is in an advantageous condition for distance detection (focusing detection). Therefore, it can be conceived that a probability of the contrast being satisfactory is high, and the number of times of light-receiving and distance detection (focusing detection) is decreased, and it is possible to quickly complete the distance detecting operation.

Also, where the detected brightness ratio is lower than the detectable range A, the environment light is in a darkroom state where almost no environmental light exists, and the brightness is just as in a case where projection light is dark, it is possible to specify that the projection screen is so large that the screen becomes dark. In this case, the focusing accuracy can be improved by increasing the number of times of distance detection (focusing detection).

And, by employing such a mechanism in a video projector and an AV system including the video projector, a focus adjusting operation can be quickened with high focusing accuracy maintained in use. Therefore, high performance of the entire system can be achieved, and even a beginner can easily handle the same, and the product value is increased.

Further, in the respective embodiments described above, a description was given of a case where the number of times of distance detection is changed in accordance with the light-receiving intensity level. However, the structure of improving the detecting accuracy of distance detection and a focusing state is not limited to the above. Various structures may be employed, for example, i) a structure of improving the accuracy of output signals, in which the accumulation time in respective pixels of the line sensors 36 and 37 is shortened in line with an increase (in brightness) in the light-receiving intensity level, and the respective pixels are prevented from being saturated in accumulation by raising the gain, ii) a structure of improving the accuracy (information amount) in output signals by increasing the number of conversion bits (for example, changing 8-bit to 16-bit) in an A/D converter for converting output signals (analog signals) from a plurality of pixels of the line sensors 36 and 37 to digital signals in line with an increase (in brightness) in the light-receiving intensity level, and increasing the information amount of the digital signals, and iii) a structure of improving the accuracy of output information by increasing the number of output signals from line sensors by using line sensors including a plurality of pixels in which pixel pitches of the line sensors 36 and 37 are further divided to be minute.

As described above, according to the invention, it is possible to maintain high focus adjusting accuracy even in a bright environment in an image-projecting apparatus.

In particular, by obtaining the brightness of projection light with respect to the environmental light and setting the conditions (number of times) of distance detection or focusing detection in accordance with the brightness, it is possible to perform a distance detecting operation or a focusing detecting operation, respectively, suitable for various use conditions, and accuracy in the focusing adjustment can be secured.

Also, when the detected light-receiving intensity level or the brightness information of projection light with respect to environmental light is within a predetermined range, the number of times of detection, which is a condition of a detecting operation, is minimized, wherein it is possible to quickly obtain an in-focus on the projection surface. In addition, when the light-receiving intensity level or the brightness information is outside the predetermined range, the further apart the light-receiving intensity level or brightness is from the predetermined range, the greater the number of times of detection, which is a condition of a detecting operation, is increased, or the signal gain is raised by further shortening the light-receiving accumulation time for detection than the accumulation time when the brightness information is within the predetermined range, or the number of bits in A/D converting the detected output signals is further increased than the number of bits when the brightness information is within the predetermined range, whereby the information amount of the detected signals and accuracy thereof can be improved, and the focusing adjustment accuracy can be improved regardless of the light-receiving intensity level or brightness information.

While preferred embodiments have been described, it is to be understood that modification and variation of the present invention may be made without departing from the scope of the following claims.

"This application claims priority from Japanese Patent Application No. 2003-371345 filed on Oct. 30, 2003, which is hereby incorporated by reference herein."

What is claimed is:

1. An image-projecting apparatus comprising:
   a projection optical system which is configured to project light from an image-forming element onto a projection surface; and
   a detecting system which is configured to perform a detecting operation of a distance to the projection surface or a detecting operation of a focusing state of the projection optical system with respect to the projection surface,
   wherein the detecting system is configured to (a) determine a condition of the detecting operation on the basis of a light-receiving intensity level of a light-receiving element which is configured to receive reflected light from the projection surface of light projected through the projection optical system, and (b) perform the detecting operation in accordance with the condition, and wherein the condition relates to a number of times of the detecting operation, and the detecting system is configured to set the number of times of the detecting operation to a minimum number of times, which can be determined by the detecting system, in a case where the light-receiving intensity level is within a predetermined range, and to set the same to a greater number of times of the detecting operation with increasing of the difference of the intensity level from the predetermined range in a case where the light-receiving intensity level is outside the predetermined range.

2. The image-projecting apparatus according to claim 1, further comprising a controller which is configured to control drive of a focusing lens included in the projection optical system on the basis of the detection results of the detecting operation.

3. The image-projecting apparatus according to claim 1, wherein the detecting system is configured to perform an averaging calculation of the detection results of a plurality of the detecting operations.

4. An image displaying system comprising:
the image-projecting apparatus according to claim 1, and
an image signal supplying apparatus which is configured to supply an image signal to the image-projecting apparatus.

5. An image-projecting apparatus comprising:
a projection optical system which is configured to project light from an image-forming element onto a projection surface; and
a detecting system which is configured to perform a detecting operation of a distance to the projection surface or a focusing state of the projection optical system with respect to the projection surface, the detecting system being configured to perform the detecting operation by projecting light onto the projection surface, receiving reflected light from the projection surface by a light-receiving element, and using a signal from the light-receiving element,
wherein the detecting system includes an environmental light detecting section which is configured to (a) detect the intensity level of environmental light, (b) determine a condition of the detecting operation on the basis of the intensity level of the environmental light or a difference between the intensity level of the environmental light and the intensity level of the reflected light on the light-receiving element, and (c) perform the detecting operation in accordance with the condition, and
wherein the condition relates to a number of times of the detecting operation, and the detecting system is configured to set the number of times of the detecting operation to a minimum number of times, which can be determined by the detecting system, in a case where the intensity level of the environmental light is within a predetermined range or in a case where the difference between the intensity level of the environmental light and the intensity level of the reflected light is outside a predetermined range, and to set the same to a greater number of times of the detecting operation in a case where the intensity level of the environmental light is outside the predetermined range or in a case where the difference is within the predetermined range.

6. The image-projecting apparatus according to claim 5, further comprising a controller which is configured to control drive of a focusing lens included in the projection optical system on the basis of the detection results of the detecting operation.

7. The image-projecting apparatus according to claim 5, wherein the detecting system is configured to perform an averaging calculation of the detection results of a plurality of times of the detecting operations.

8. An image displaying system comprising:
the image-projecting apparatus according to claim 5, and
an image signal supplying apparatus which is configured to supply an image signal to the image-projecting apparatus.

9. An image-projecting apparatus comprising:
a projection optical system which is configured to project light from an image-forming element onto a projection surface;
a detecting system which is configured to perform a detecting operation, by using light from the projection surface, of a distance to the projection surface or a focusing state of the projection optical system with respect to the projection surface,
wherein the detecting system is configured to (a) obtain brightness information regarding brightness based on projection light with respect to brightness based on environmental light on the projection surface on the basis of a signal from a light-receiving element which is configured to receive light from the projection surface, (b) determine a condition for executing the detecting operation on the basis of the brightness information, and (c) perform the detecting operation in accordance with the condition, and
wherein the condition relates to a number of times of the detecting operation, and the detecting system is configured to set the number of times of executing the detecting operating to a minimum number of times, which can be determined by the detecting system, in a case where the brightness information is within a predetermined range, and to set the same to a greater number of times with increasing of the difference of the brightness information from the predetermined range in a case where the brightness information is outside the predetermined range.

10. The image-projecting apparatus according to claim 9, wherein the detecting system is configured to obtain the brightness information as a ratio of brightness based on the projected light to brightness based on environmental light or as a ratio of the sum of the brightness based on the projected light and the environmental light to the brightness based on the environmental light.

11. The image-projecting apparatus according to claim 9, further comprising:
a first light-receiving element which is configured to receive light from a projection area of the light through the projection optical system; and
a second light-receiving element which is configured to receive lights from an outer area other than the projection area.

12. The image-projecting apparatus according to claim 9, further comprising a controller which is configured to control drive of a focusing lens included in the projection optical system on the basis of the detection results of the detecting operation.

13. The image-projecting apparatus according to claim 9, wherein the detecting system is configured to perform an averaging calculation of the detection results of a plurality of times of the detecting operations.

14. An image displaying system comprising:
the image-projecting apparatus according to claim 9, and
an image signal supplying apparatus which is configured to supply an image signal to the image-projecting apparatus.

15. An image-projecting apparatus comprising:
a projection optical system which is configured to project light from an image-forming element onto a projection surface; and
a detecting system which is configured to perform a detecting operation of a distance to the projection surface or a focusing state of the projection optical system with respect to the projection surface by using light from the projection surface,
wherein the detecting system includes light-receiving elements which are configured to receive light from a projection area on the projection surface and an outer area other than the projection area, respectively, and the detecting system is configured to (a) determine a condition of the detecting operation on the basis of the light-receiving intensity levels of the light-receiving elements of the light from the projection area and the light from the outer area and (b) perform the detecting operation in accordance with the condition, and
wherein the condition relates to a number of times of the detecting operation, and the detecting system is configured to set a number of times of the detecting operation to a minimum number of times, which can be determined by the detecting system, in a case where the light-receiving intensity level of the light from the projection area and the light-receiving intensity level of the light from the outside of the projection area are outside predetermined ranges, and to set the same to a greater number of times of the detecting operation in a case where the light-receiving intensity level of the light from the projection area and the light-receiving intensity level of the light from the outside of the projection area are within the predetermined ranges.

16. The image-projecting apparatus according to claim 15, further comprising a controller which is configured to control drive of a focusing lens included in the projection optical system on the basis of the detection results of the detecting operation.

17. The image-projecting apparatus according to claim 15, wherein the detecting system is configured to perform an averaging calculation of the detection results of a plurality of times of the detecting operations.

18. An image displaying system comprising:
the image-projecting apparatus according to claim 15, and
an image signal supplying apparatus which is configured to supply an image signal to the image-projecting apparatus.

19. An image-projecting apparatus comprising:
a projection optical system which projects light from an image-forming element onto a projection surface; and
a detecting system which performs a detecting operation of a distance to the projection surface or a focusing state of the projection optical system with respect to the projection surface, the detecting system performing the detecting operation by projecting light onto the projection surface and by using signal from a light-receiving element;
wherein the light-receiving element receives light from the projection area of the light on the projection surface and light from an outer area other than the projection area; and
the detecting system obtains brightness information of the projection area and the outer area by using the signal from the light-receiving element, determines a condition of the detecting operation on the basis of the brightness information of at least one of the projection area an the outer area, and performs the detecting operation in accordance with the condition.

20. The image-projecting apparatus according to claim 19, wherein the condition is the number of times of the detecting operations.

21. The image-projecting apparatus according to claim 19, further comprising a controller which controls drive of a focusing lens included in the projection optical system on the basis of the detection results of the detecting operation.

22. The image-projecting apparatus according to claim 19 wherein the detecting system performs an averaging calculation of the detection results of a plurality of times of the detecting operations.

23. An image displaying system comprising:
the image-projecting apparatus according to claim 19, and
an image signal supplying apparatus which an image signal to the image-projecting apparatus.

* * * * *

UNITED STATES PATENT AND TRADEMARK OFFICE
CERTIFICATE OF CORRECTION

PATENT NO. : 7,220,003 B2
APPLICATION NO. : 10/970134
DATED : May 22, 2007
INVENTOR(S) : Masaharu Eguchi It is certified that error appears in the above-identified patent and that said Letters Patent is hereby corrected as shown below:

Title Page should be deleted and substitute therefore the attached title page.

IN THE DRAWINGS:
Sheet 5, FIG. 5, Item S111, "FOUING" should read --FOCUSING--; Items S106, S107, and S108, "FOCUING" should read --FOCUSING--: Item S106, "DISUTANCE" should read --DISTANCE--, and Item S104, "AD" should read --A/D--, as shown on the attached page.
Sheet 6, FIG. 6, "FOCUING" should read --FOCUSING--.

COLUMN 1:
Line 27, "which an" should read --in which a--.
Line 46, "is performs" should read --is performed--.
Line 57, "No.2001-317935" should read --No. 2001-317935--.

COLUMN 2:
Line 3, "No.2001-" should read --No. 2001--.
Line 6, "projected, the" should read --projected. The--.
Line 12, "projected" should read --projecting--.
Line 15, "increased," should read --increases,--.
Line 21, "driven a" should read --driven by a--.

COLUMN 3:
Line 45, "area on the" should read --area and the--.

COLUMN 5:
Line 33, "in according" should read --"according"--.
Line 36, "relatively" should read --to relatively--.
Line 55, "outputs" should read --output--.

COLUMN 6:
Line 24, "pair of lens" should read --pair of lenses--.

(12) United States Patent
Eguchi

(10) Patent No.: US 7,220,003 B2
(45) Date of Patent: May 22, 2007

(54) IMAGE-PROJECTING APPARATUS

(75) Inventor: Masaharu Eguchi, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 257 days.

(21) Appl. No.: 10/970,134

(22) Filed: Oct. 22, 2004

(65) Prior Publication Data
US 2005/0094112 A1   May 5, 2005

(30) Foreign Application Priority Data
Oct. 30, 2003   (JP)   ............................. 2003-371345

(51) Int. Cl.
*G03B 21/26* (2006.01)
*G03B 21/00* (2006.01)
*G03B 21/14* (2006.01)
*G03B 21/20* (2006.01)
*G03B 3/00* (2006.01)

(52) U.S. Cl. .................... 353/30; 353/69; 353/70; 353/85; 353/101

(58) Field of Classification Search ............... 353/30, 353/69, 70, 85, 101; 352/140, 141
See application file for complete search history.

(56) References Cited

U.S. PATENT DOCUMENTS

| | | | |
|---|---|---|---|
| 5,532,765 A * | 7/1996 | Inoue et al. | 348/807 |
| 6,846,081 B2 * | 1/2005 | Mochizuki et al. | 353/70 |
| 6,939,011 B2 * | 9/2005 | Kobayashi | 353/69 |
| 7,108,378 B2 * | 9/2006 | Eguchi | 353/30 |
| 7,125,122 B2 * | 10/2006 | Li et al. | 353/31 |
| 2005/0046803 A1 * | 3/2005 | Akutsu | 353/69 |

FOREIGN PATENT DOCUMENTS

| | | |
|---|---|---|
| JP | 5-188282 | 7/1993 |
| JP | 6-160085 | 6/1994 |
| JP | 2000-28901 | 1/2000 |
| JP | 3120526 B2 | 12/2000 |
| JP | 2001-317935 | 11/2001 |
| JP | 3272429 B2 | 4/2002 |

* cited by examiner

*Primary Examiner*—Melissa J. Koval
(74) *Attorney, Agent, or Firm*—Fitzpatrick, Cella, Harper & Scinto

(57) ABSTRACT

The present invention discloses an image-projecting apparatus which employs an AF (auto-focusing) system suitable for use conditions of the image-projecting apparatus and is capable of securing satisfactory AF accuracy under bright conditions. The image-projecting apparatus comprises a projection optical system which projects light from an image-forming element onto a projection surface, and a detecting system which performs a detecting operation of a distance to the projection surface or a detecting operation of a focusing state of the projection optical system with respect to the projection surface. The detecting system determines a condition of the detecting operation on the basis of the light-receiving intensity level of the light-receiving element which receives reflected light from the projection surface of light projected and performs the detecting operation in accordance with the condition.

23 Claims, 9 Drawing Sheets

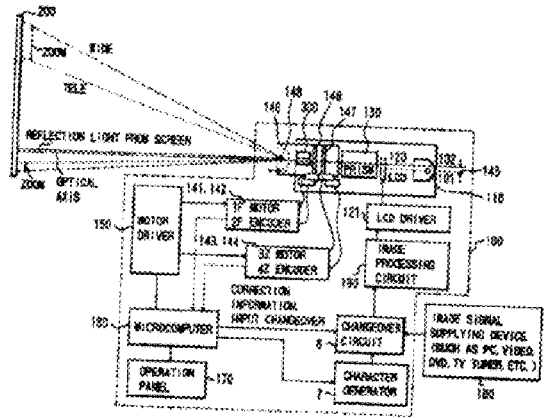

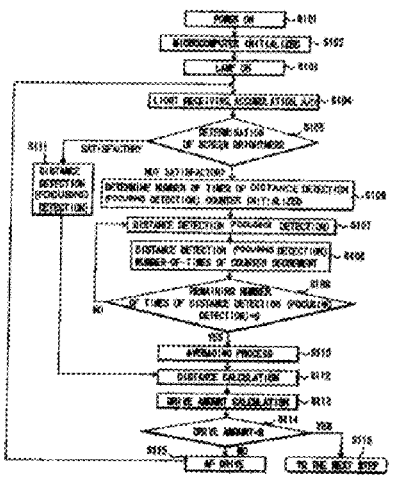

UNITED STATES PATENT AND TRADEMARK OFFICE
CERTIFICATE OF CORRECTION

PATENT NO. : 7,220,003 B2
APPLICATION NO. : 10/970134
DATED : May 22, 2007
INVENTOR(S) : Masaharu Eguchi It is certified that error appears in the above-identified patent and that said Letters Patent is hereby corrected as shown below:

COLUMN 9:
Line 40, "(CPU 41)" should read --(CPU 41).--.

COLUMN 10:
Line 46, "light,)" should read --light),--.

COLUMN 13:
Line 38, "level)" should read --level).--.

COLUMN 15:
Line 21, "a window" should read --as a window--.

COLUMN 20:
Line 16, "using signal" should read --using a signal--.
Line 27, "area an the" should read --area and the--.
Line 36, "claim 19" should read --claim 19,--.
Line 42, "which an" should read --which supplies an--.

Signed and Sealed this

Thirteenth Day of May, 2008

JON W. DUDAS
*Director of the United States Patent and Trademark Office*